United States Patent Office 3,637,655
Patented Jan. 25, 1972

3,637,655
METHOD FOR EXTRACTING WATER-SOLUBLE SUBSTANCES FROM BIOLOGICAL MATERIALS
John R. Clendenning, Washington, D.C., assignor to Hazleton Laboratories, Inc., Falls Church, Va.
No Drawing. Continuation-in-part of application Ser. No. 433,488, Feb. 19, 1965. This application Sept. 1, 1967, Ser. No. 664,945
Int. Cl. C07d 51/54, 55/62
U.S. Cl. 260—211.5 R    8 Claims

ABSTRACT OF THE DISCLOSURE

In a method for determining the quantity of adenosine triphosphate (ATP) in a sample containing biological cells, for example, by reacting ATP with luciferin and luciferase and detecting the light emitted, the invention comprising mixing dimethyl sulfoxide and the sample, preferably in the presence of $H_2O$, thereby extracting ATP from the biological cells.

CROSS REFERENCE TO RELATED APPLICATION

This application is a continuation-in-part of U.S. application Ser. No. 433,488, now abandoned filed Feb. 19, 1965, entitled Method of Detecting Living Organisms.

BACKGROUND OF THE INVENTION

ATP is present in all biological cellular substances, e.g., living organisms, leucocytes, erythrocytes, etc. Therefore, by analyzing a sample of an environment for ATP it is possible to detect the presumptive presence of biological cellular substances in that environment. This detection is applicable, for example, in the determination of background levels of bacteria in environments, such as, air, fuels, water, milk, food, medical supplies, pharmaceuticals, clean assembly areas, hospital rooms and germ-free areas, and the detection of increased contamination in these environments; in the detection of infections, e.g., kidney infections by urine analysis; in blood analysis; in biomedical studies of bacteria cultures; and in monitoring the effectiveness of pollution controls and sterilization procedures and the sterilization of compounds and apparatus.

Since ATP is restricted within bacteria or other biological cellular materials, e.g., mitochondra, the total ATP in a given sample is not available in an extracellular free-state for assay. One method which has been employed to extract ATP from biological cellular materials is ultrasonic disruption. This method, however, does not yield the degree of release necessary for an accurate quantitative determination of ATP.

SUMMARY OF THE INVENTION

The instant invention allows a substantially complete extraction of intracellular water-soluble substances. It comprises mixing dimethyl sulfoxide and biological cells, preferably in the presence of water, whereby an extracellular solution of the water-soluble substance is obtained.

DETAILED DESCRIPTION

This invention may be used to extract water-soluble substances (e.g., nucleotides, nucleosides, flavins, water-soluble vitamins and water-soluble cofactors) from biological cellular materials. Thus, by the practice of this invention, ATP may be extracted from tissue cells, adenosine from reaction products, riboflavin from spinach, ascorbic acid from citrus, and coenzyme A from egg yolk.

To illustrate the nature of the invention, specific reference will be made hereinafter to the extraction of the nucleotide ATP.

Environments containing biological cellular substances from which ATP may be extracted include, inter alia, animal or plant tissues, suspensions of microorganisms, blood, urine, water or beverages suspected of containing microorganisms, and food or other contaminated environments. The procuring of a sample of an environment and its subsequent storage prior to ATP extraction may be carried out by any appropriate method known in the art.

In the present invention, ATP is extracted from biological cells present in a sample of an environment by mixing dimethyl sulfoxide (DMSO) or an aqueous solution thereof and the sample. (DMSO is a high-boiling-point organic solvent, miscible with water in all proportions and exhibiting a very low order of toxicity.)

It is generally preferred that the sample be in aqueous suspension prior to extraction. However, where the amount of ATP per volume of sample, and consequently the number of biological cells, is below the limit of detectability, an adequate volume of sample may be filtered through a microporous membrane. The membrane, together with the material retained on it, is then contacted with DMSO.

The resultant sample mixture containing extracellular ATP may then be analyzed by means of the firefly bioluminescent technique disclosed in application Ser. No. 433,488, by contacting an aliquot of the mixture in the presence of oxygen with a reaction mixture which contains luciferin, luciferase and a magnesium salt, and monitoring for the emission of light. The aqueous reaction medium (reaction mixture+sample mixture) will generally contain enough oxygen to allow the reaction to take place. The quantity or maximum intensity of light emitted is a measure of the ATP present.

The reaction mixture may be prepared using firefly lantern extract or the individual constituents which participate in the bioluminescent reaction.

Firefly lantern extract may be obtained commercially or prepared in the laboratory. Commercial lyophilized firefly lantern extract is preferably dissolved in a sterile aqueous solution (pH 7.4) having $MgSO_4$ and potassium arsenate in concentrations of 0.01 M and 0.05 M, respectively. Alternatively, various other buffers, such as, tris(hydroxymethyl) aminomethane, may be used.

In the laboratory, desiccated firefly tails are ground to a fine powder with mortar, pestle and a small amount of washed silica. The powder is then extracted with 0.05 M $AsO_4^{-3}$ (or other buffer)-0.01 M $MgSO_4$ at pH 7.4.

To realize optimum light response, a controlled reaction mixture is prepared from the individual constituents—luciferin, purified luciferase and a $Mg^{++}$ salt. For example, luciferin, purified luciferase and $MgSO_4$ may be dissolved in a sterile aqueous solution with arsenate and/or other buffers added to provide a pH of 7.4.

In order to observe and record small amounts of light produced by a positive response between the material to be assayed and the reaction mixture and to make quantitative measurements of the light emitted, instruments which will sense and record the intensity of the emitted light should be used. One procedure consists of injecting the aliquot of sample mixture prepared in accordance with the practice of this invention into a cuvette containing the reaction mixture. (Alternatively, the reaction mixture may be injected into a cuvette containing the sample mixture.) The sample mixture is held at pH of 7.4 with potassium arsenate buffer to prevent hydrolysis which occurs at high acid concentrations. (The buffer may be added before or after ATP is extracted from the biological cellular materials.) The light emitted as the result of the reaction between extracellular ATP in the sample mixture and the reaction mixture strikes the photosensitive surface of a photomultiplier tube giving rise to an electric signal which can be measured and recorded by either an oscilloscope photograph or a chart recorder.

Because the response (i.e., light emission) is almost instantaneous, the reaction mixture should be positioned in front of the light detector prior to the introduction of the sample mixture. Also, the reaction mixture and the sample mixture should be mixed as rapidly as possible. The bioluminescent response with ATP is determined by measuring the maximum intensity of the emitted light, which decays logarithmically after reaching this intensity. With all other factors constant, the maximum intensity is directly proportional to the concentration of ATP.

Instrumentation useful for the quantitative measurement of bioluminescence may consist of a photo-multiplier tube for the conversion of light energy into an electrical signal, a device for determining the magnitude of the signal and a light-tight chamber for presentation of the bioluminescent reaction to the photomultiplier tube.

In one system, part of the assembly consists of a composite sensing and reaction chamber which contains a photomultiplier tube, with appropriate circuitry, and a rotary cylinder mounted in a block of aluminum in a manner which permits removal of the reaction chamber without exposing the phototube to light. A section of the cylinder wall is cut out to accommodate a cuvette in a suitable reflector. Immediately above the cuvette holder is a small injection port sealed with a replaceable light-tight rubber plug. The entire unit is painted black to reduce light reflection. The photomultiplier converts the light energy into an electrical signal. An oscilloscope, which records the magnitude of the signal from the photomultiplier, is provided with an adjustable vertical deflection scale which will allow an adjustment in system sensitivity. There is a multiple switching arrangement at the oscilloscope input which makes it convenient to adjust the system zeros and balances. The differential input to the oscilloscope provides a means to balance the dark current output of the phototube. The response to the firefly luminescent system displayed on the oscilloscope screen is recorded with a camera which mounts directly onto the front of the oscilloscope. To observe and record the reaction, the cuvette containing the necessary reagents is positioned in the cuvette holder without exposing the phototube. Rotation of the holder positions the cuvette in front of the phototube. The sample mixture, presumed to contain ATP, is then added through the injection port and the magnitude of the response, if any, is recorded by the camera.

The following examples demonstrate the use of aqueous solutions of DMSO to extract ATP from biological cellular materials.

Example 1

One ml. of a *S. marcescens* cell suspension was added to 10 ml. of a 30% aqueous solution of dimethyl sulfoxide. After standing for 5 minutes, the mixture was assayed by adding 0.1 ml. of treated cell suspension, containing extract from about $10^6$ cells, to 1.5 ml. of firefly lantern extract. A response of about 3200 mv. was recorded.

Examples 2–7

One ml. aliquots of a 24 hour culture of *E. coli* were centrifuged at 3000 r.p.m. for 20 minutes. The supernatant of each was poured off and the precipitates mixed with 0.95 ml. aqueous solutions of various DMSO concentrations. After standing for 30 seconds, the mixtures were assayed by adding 0.01 ml. of each to 0.1 ml. of a controlled mixture of luciferin, purified luciferase, MgSO$_4$ and potassium arsenate at pH 7.4. The following responses were observed:

| Example | % DMSO | Response (mv.) |
|---|---|---|
| 2 | 10 | 400 |
| 3 | 25 | 3,800 |
| 4 | 75 | 28,000 |
| 5 | 90 | 24,500 |
| 6 | 92.5 | 30,700 |
| 7 | 95 | 22,000 |

It is to be noted that the observed responses of Examples 2–7, per the same sample size, are higher than the response of Example 1. This can be attributed primarily to two factors: (1) in Example 1 a crude firefly lantern extract was used instead of the purified constituents of Examples 2–7; and (2) different instruments were used to measure the light responses, the photomultiplier tube of the apparatus used in Example 1 having the lower amplification factor.

It will be understood that various changes in the details, materials, steps, order of steps, etc., which have been herein described and illustrated in order to explain the nature of the invention, may be made by those skilled in the art within the principle and scope of the invention as expressed in the appended claims.

I claim:
1. A method for treating biological cells to extract a water-soluble substance selected from the group consisting of water-soluble nucleotides, water-soluble nucleosides, flavins, water-soluble vitamins and water-soluble cofactors from biological cells when contained in said cells comprising mixing dimethyl sulfoxide and said biological cells in the presence of water whereby an extracellular solution of said water-soluble substance is obtained.
2. The method of claim 1 wherein said dimethyl sulfoxide is in aqueous solution.
3. The method of claim 1 wherein said biological cells are in aqueous suspension.
4. The method of claim 1 wherein the resultant mixture is at least a 25% dimethyl sulfoxide solution.
5. The method of claim 1 wherein the resultant mixture is at least a 75% dimethyl sulfoxide solution.
6. The method of claim 1 wherein the resultant mixture is about a 90% to about a 95% dimethyl sulfoxide solution.
7. The method of claim 1 wherein said water-soluble substance is adenosine triphosphate.
8. A method for treating biological cells to extract a water-soluble substance selected from the group consisting of water-soluble nucleotides, water-soluble nucleosides, flavins, water-soluble vitamins and water-soluble cofactors from biological cells when contained in said cells comprising mixing dimethyl sulfoxide and said biological cells and combining the resultant mixture with an aqueous solution whereby an extracellular solution of said water-soluble substance is obtained.

References Cited

UNITED STATES PATENTS 3,321,463  5/1967  Moffatt _____ 260—211.5
3,432,487  3/1969  Levin _____ 260—211.5

ELBERT L. ROBERTS, Primary Examiner
J. R. BROWN, Assistant Examiner

U.S. Cl. X.R.

195—103.5 R; 260—210 F, 211.7, 343.7, 999